Patented Jan. 7, 1947

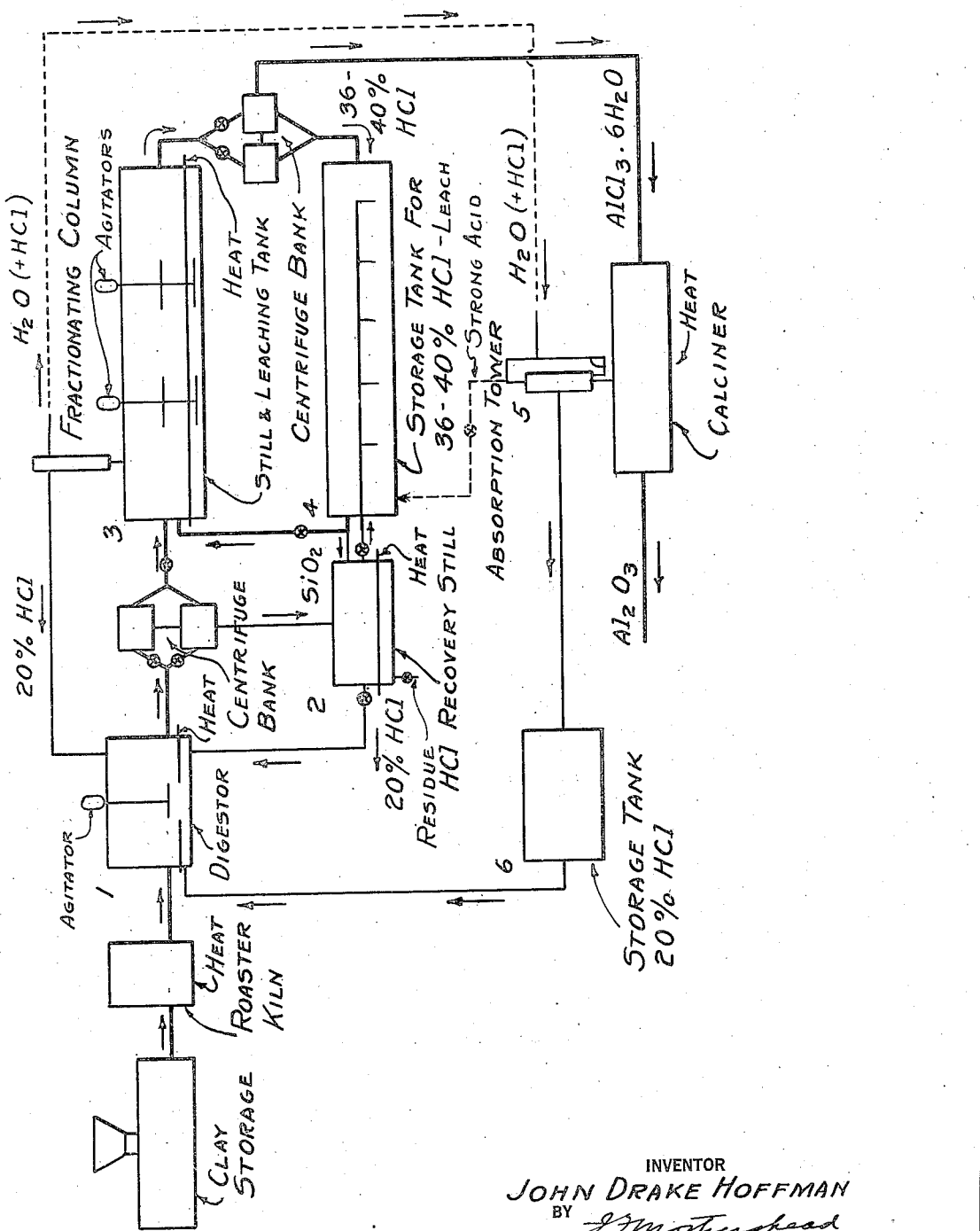

2,413,709

UNITED STATES PATENT OFFICE 2,413,709

METHOD OF RECOVERING ALUMINA AND HYDROCHLORIC ACID

John D. Hoffman, Chevy Chase, Md.

Application March 31, 1943, Serial No. 481,294

1 Claim. (Cl. 23—142)

(Granted under the act of March 3, 1883, as amended April 30, 1928; 370 O. G. 757)

The invention or discovery described herein may be made and used by or for the Government of the United States without the payment of any royalty therefor.

This invention relates to extraction of alumina as from kaoline or other alumina bearing material, for example other clays or low grade bauxite, and aims generally to improve the same.

In the process described by Drs. James I. Hoffman and G. E. F. Lundell, of the National Bureau of Standards, in their co-pending application, Serial No. 438,022, filed April 7, 1942, the metal chloride resulting from digestion of clay with concentrated hydrochloric acid, preferably under high temperature and pressure, and thus stripped of its silica content, is cooled and treated with hydrochloric acid gas to effect a precipitation of aluminum chloride and the precipitate and residual liquors are then separated for further treatment. That method, while yielding on ignition of the aluminum chloride a substantially pure aluminum oxide product, presents difficulties in the handling of the hydrochloric acid gas in the system under pressure.

The present invention aims to improve the separation of aluminum chloride from the digestion product of such a system and to improve the recovery of hydrochloric acid following the digestion step and also during the calcining or igniting step following separation of the chlorides. A particular object of the invention is to provide a new method of extracting impurities from the chloride mixture after separation of the silica therefrom, and other and further objects and advantages of the invention severally and cooperatively will be apparent from the following description of a preferred embodiment illustrating the principles of the invention.

The accompanying drawing exemplifying one mode of practicing the invention is a flow sheet of a complete system embodying the improvements herein claimed, in which the heavy lines indicate the main line process, while lighter lines refer to by-product and HCl recovery features.

Referring to the illustrative embodiment shown in the flow sheet in which kaolin is considered as the aluminum bearing material to be treated, the complete operation may be briefly summarized as follows:

In accordance with this process the aluminum bearing material, herein kaolin, is roasted for an hour or two at about 700° C. to render the alumina in the ore soluble. Temperatures below 600° C. do not make all of the aluminum soluble in dilute hydrochloric acid, and a temperature much above 800° C. is apt to be uneconomical and may indeed render the alumina insoluble. The best temperature for roasting varies somewhat with different clays and other aluminum bearing materials, and in treating the same it will be apparent to those skilled in the art that the roasting temperature may be varied without departing from the principles of this invention. Following the roasting step the material is digested in dilute hydrochloric acid solution, preferably of constant boiling concentration. The use of the constant boiling acid allows operation at atmospheric pressure, and this acid is sufficiently strong for adequate decomposition of kaolin and most other aluminum bearing materials such as clays, low grade bauxite, and the like. Weaker acid than 18% by weight impairs proper digestion and would unnecessarily dilute the system. Stronger acid than the constant boiling may lose much hydrochloric acid gas when heated in the digesting process, and would require apparatus sealed for pressure. In the case of clays other than easily soluble clays pressure may deliberately be used in conjunction with the acid to decompose the clay and render the alumina soluble. Since kaolin is easily obtainable in pure state, this clay is preferred when available as its use avoids necessity of a pressure-tight apparatus. Further the constant boiling acid is easily handled and can be obtained directly from other steps of the process, for example, from the sludge acid separator, the calciner, and the recovery still for separation of hydrochloric acid from side products.

Following the digestion step the digested material is centrifuged or otherwise separated into solid and liquid phases, the solid mass being silica practically devoid of alumina and other metals but retaining small quantities of hydrochloric acid adhering to the silica, wherefore, if desired, the silica may be placed in a recovery still and heated to drive off the adhering hydrochloric acid solution. If desired, the hydrochloric acid thus recovered can be passed through a rectifier, or through the calciner absorption tower, hereinafter described, where it will be fortified, and may be either stored, put in the digestor, or otherwise disposed of. If the adhering hydrochloric acid, under certain circumstances is not worth the expenditure of heat to recover it, it may, of course, be discarded.

The liquid portion of the digestate from the centrifuge (or other device for separating the silica) which is a solution of $AlCl_3.6H_2O$ and other metal chlorides, is passed to the sludge-acid separator which is preferably embodied as a single still and leaching tank, although these steps may obviously be performed in separate chambers. Here the digestate solution of chlorides is heated initially to separate a large part of the water and constant boiling hydrochloric acid and leave a chloride solution which may have a consistency between that of thick cream to a fairly solid crystal bearing paste. At the commencement of the separating step the vapor is largely $H_2O$, and as the residual liquid becomes more concentrated in acid, evolution of constant-boiling acid is approached (20.22 percent HCl). During this interval the temperature of the vapor evolved rises from around 100° C. to 108° C. where it remains during the evolution of the constant-boiling acid. Preferably the vapors are passed through a fractionating column, the initial discharge of which is water, and is discarded. When the evolved vapors are about 20 percent HCl, the column discharges 20 percent acid which may be suitably recovered (as by returning it to the digestor). Just before the evolution of the constant boiling acid to column's discharge may be fed to the calciner absorption tower described below so that no undue loss of HCl will occur before switchover is made to digestor. The heating is preferably done by circulation of steam or other suitable heat transfer liquid in acid-resistant pipes or bayonets ("Karbate" is a suitable material) which are immersed in the liquid to be so treated. When the proper consistency of the sludge is approached (this may be detected by a notable rise above 108° C. of the liquid) the heating medium is cut off so that the sludge does not cake appreciably, which may occur if the sludge temperature rises too high. Preferably the sludge should be agitated during the latter part of the heating operation to facilitate evolution of HCl, and to prevent local overheating which might result in forming an acid-impervious cake. Trial indicates that 120° C. is not too high. In short, the aforesaid step consists in separating from the chloride content of the digestion liquor the bulk of the relatively dilute acid solution in which it was carried, as well as the excess water over and above that corresponding to the constant boiling acid.

Evaporation at reduced pressure has been found desirable because the cake which forms is more pervious to acid, owing to the fact that a lower temperature suffices to vaporize the liquid under reduced pressure.

The sludge is thus prepared for leaching. The leaching in accordance with this invention is to be carried out with strong hydrochloric acid solution (36 percent to 40 percent acid is satisfactory) saturated with $AlCl_3.6H_2O$ at the temperature of use, but not saturated with respect to the other chlorides in the sludge. The invention contemplates starting operation with the HCl solution substantially free of $AlCl_3.6H_2O$, and relying on the first leaching operation to saturate it therewith; also the addition of make-up solution free of $AlCl_3.6H_2O$ which will similarly become saturated. Further it is contemplated that from time to time the $AlCl_3.6H_2O$ solution (which may be termed in short an "impurity leach") may be in part or whole drawn off to an HCl recovery still (which may be the same still as that used for the recovery of HCl from $SiO_2$, alternately used for this purpose) where HCl gas is evolved for return to the leach storage tank where it is redissolved in the liquid contained therein. The constant-boiling acid resulting from this step (gas comes off first, then constant-boiling acid) is returned to the digestor directly or by way of a storage tank. The residual chlorides from this leach purifying step may be passed to recovery stages if desired. Most of the chloride ion can be removed in the form of HCl (as by treating the residue with sulfuric acid in the aforementioned recovery still) and used in the process again. Preferably, the leach purification will be carried out at a rate which nearly coincides with the rate at which impurities are delivered to the leach by way of the sludge.

Leaching out of impurities is accomplished by bringing the leach and sludge into contact, preferably with strong agitation, for a sufficient time to substantially remove all chlorides except $AlCl_3.6H_2O$ from the sludge. This operation may be done in separate containers, or in the same container in which concentration was accomplished. Preferably, the sludge is cooled, or allowed to cool, to a temperature no greater than the effervescence temperature of the leach solution. Where this is 36 percent to 40 percent HCl this temperature is around 37° C. at 1 atmosphere. It is thus desirable that the sludge have a temperature of not over 35° C. Room temperature (20 to 30° C.) is quite satisafactory. It is unnecessary to cool below room temperature, and excessive cooling may perceptibly increase the time required for leaching. On the other hand, temperature too near the effervescent temperature of the leach would cause pressure to build up, and undue losses of gas would occur. The leach may be added to the sludge in proportions as low as 200 cc. of leach to 500 grams of sludge, but it is preferable to use larger quantities of leach, e. g., 1 liter of leach to 500 grams of sludge, or any convenient multiple thereof. Experience has indicated that substantially all the impurities come out quickly, and that continued treatment (one-half hour or more) removes all but traces of impurities. It may be noted that after the centrifuging step subsequently to be described, the $AlCl_3.6H_2O$ may be releached with strong acid any suitable number of times to give a product of the purity desired, the leach being used in a similar manner to the above, and purified in the same way, or if very small in quantity, it may be used to take out impurities not previously removed by the previous leach, and then discarded, or added to the system in a suitable fashion. It has been found that more than one leach is not generally necessary to produce an acceptable product.

The leaching may be summarized as treating the chloride sludge separated from the excess acid and water with an acid leach of strong HCl substantially saturated with $AlCl_3.6H_2O$ to avoid further extraction of $AlCl_3.6H_2O$ from the sludge, but maintained well below its saturation level with respect to impurities contained in the sludge.

Following the leaching step, the sludge, substantially freed of its impurities is separated from the leach solution by any suitable manner as by centrifuge or filter press, and the leach returned to the leach storage tank for reuse. The $AlCl_3.6H_2O$ is removed (it is a solid, and is crystalline) for use or further treatment. For such treatment, the invention contemplates heating in a "calciner" made of any heat and acid-resistant material (such as a suitable firebrick) to produce $Al_2O_3$ and to recover the HCl which comes off. This HCl is largely gas, and it is contemplated that a water-absorber be used to catch the gas, and convert it into HCl of a concentration convenient for reuse in the digestor. Some of the HCl gas produced may, from time to time, be used to recoup the leach solution. The reaction is $2AlCl_3.6H_2O + \text{heat} \rightleftarrows Al_2O_3 + 6HCl + 9H_2O$. The calcination succeeds best at temperatures above 900° C.

The process shown in the flow sheet is a regenerative process; that is, most of the HCl which originally enters the system is continually reused. A high percentage of recovery is possible. Materials found to be feasible in this process are "Haveg" (a phenol-formaldehyde resin containing a large proportion of acid-leached asbestos filler) for tanks and pipe, "Karbate" (a bonded carbon composition, molded and baked, having a heat conductivity approaching that of iron and an immunity from acid attack like that of carbon) for heat conduction in acid solution, synthetic rubber for linings, gaskets, etc., and acid resistant fire brick for calciner. Glass, "Amersil," "Vitreosil" (high silica glassy materials approaching quartz in their resistance to heat shock and acid), porcelain pipe, stoneware, and "Karbate" are all acid resistant and may be used where their shapes and physical properties permit. Any other convenient acid-resistant materials may be used in contact with the acid. Conventional materials can be used where acid resistance is not necessary, e. g., wood or steel tanks may be used for clay storage.

The purity of the alumina that is obtained directly from the centrifuge without any washing of adhering impurity leach solution from the chloride, and by subsequent calcination of the chloride at 1000° C., is approximately 99.8 percent as is shown by National Bureau of Standards spectrochemical analysis. The major impurities are chlorine 0.1 percent, iron 0.03 percent, silicon 0.03 percent, and magnesium 0.03 percent. The other impurities found in traces in this analysis (silver*, calcium, chromium*, copper*, gallium, manganese, molybdenum, nickel, lead, and vanadium) are present in percentages below 0.01. Those starred probably came from the apparatus used.

From the foregoing detailed description it will be apparent that the present invention simplifies and improves the separation of other metal chlorides from the aluminum chloride of the digestate, avoids the difficulties inherent in treating material with hydrochloric acid in gaseous phase, enables operations to be carried out almost entirely at atmospheric pressure, contributes to the economic use of hydrochloric acid and thus improves the efficiency of the process in its most important phase, provides directly a product suitable for further treatment by the Hall process for extraction of aluminum, and provides for recovery of side products if desired. It will further be apparent that the invention is not limited to the particular arrangement of steps and apparatus shown to illustrate the same and that modifications therein may be made without departure from the principles of this invention.

I claim as my invention:

In a process in which a dilute hydrochloric acid solution of aluminum and other metals is heated to drive off water and constant boiling HCl therefrom, and in which aluminum chloride hexahydrate is calcined to reduce it to the oxide and recover its hydrochloric acid content, the improvement which consists in absorbing the hydrochloric acid gas from the calciner in an absorption tower, passing the driven off water and constant boiling HCl aforesaid through a fractionating column, and delivering the effluent from the fractionating column for an interval preceding the delivery of constant boiling HCl therefrom to said absorption tower.

JOHN D. HOFFMAN.